United States Patent [19]

Ikeyama et al.

[11] Patent Number: 4,747,946
[45] Date of Patent: * May 31, 1988

[54] TUBULAR MEMBRANE ULTRAFILTRATION MODULE

[75] Inventors: Norio Ikeyama; Noriaki Yoshioka; Shusaku Tamaru; Hisashi Ichinose, all of Osaka, Japan

[73] Assignee: Nitto Electric Industrial Co., Ltd., Japan

[*] Notice: The portion of the term of this patent subsequent to Nov. 17, 2004 has been disclaimed.

[21] Appl. No.: 69,080

[22] Filed: Jul. 2, 1987

Related U.S. Application Data

[63] Continuation of Ser. No. 468,746, Feb. 22, 1983, Pat. No. 4,707,261, which is a continuation of Ser. No. 237,050, Feb. 23, 1981, abandoned, which is a continuation of Ser. No. 065,018, Aug. 9, 1979, abandoned.

[30] Foreign Application Priority Data

Aug. 9, 1978 [JP] Japan ................................. 53-97734

[51] Int. Cl.$^4$ ............................................. B01D 13/00
[52] U.S. Cl. ............................... 210/321.8; 210/323.2; 210/321.84
[58] Field of Search ...................... 210/321.89, 321.61, 210/321.8, 323.2, 339, 321.64, 321.79, 433.2; 55/158

[56] References Cited

U.S. PATENT DOCUMENTS

| | | | |
|---|---|---|---|
| 3,367,504 | 2/1968 | Westmoreland | 210/321.83 |
| 3,457,170 | 7/1969 | Havens | 210/641 |
| 3,462,362 | 8/1969 | Kollsman | 210/636 |
| 3,643,805 | 2/1972 | Hoffman | 210/321.87 |
| 3,746,591 | 7/1973 | Branfield | 156/191 |
| 3,773,181 | 11/1973 | Calderwood et al. | 210/321.66 |
| 3,834,545 | 9/1974 | Del Pico et al. | 210/321.89 |
| 3,966,616 | 6/1976 | Bray | 210/450 |
| 4,016,078 | 4/1977 | Clark | 210/321.9 |
| 4,021,350 | 5/1977 | Koslowski | 210/232 |

Primary Examiner—Richard V. Fisher
Assistant Examiner—Coreen Y. Lee
Attorney, Agent, or Firm—Sughrue, Mion, Zinn, Macpeak, and Seas

[57] ABSTRACT

An improved tubular membrane filtration module including an outer cylinder and a plurality of water permeable non-woven fabric pipes formed on the inside thereof, the non-woven fabric pipes being inserted into the outer cylinder in a closely bundled state, the spaces between the fabric pipes and the outer cylinder at each end thereof being filled with hardened synthetic resin to fix and seal the assembly. The ends of the non-woven fabric pipes are coated with a resin such that the inside coating of resin at the end of the fabric pipes is less than that on the inside thereof.

8 Claims, 1 Drawing Sheet

TUBULAR MEMBRANE ULTRAFILTRATION MODULE

This is a continuation of Ser. No. 468,746 filed on Feb. 22, 1983 of Norio IKEYAMA et al entitled "TUBULAR MEMBRANE ULTRAFILTRATION MODULE", now U.S. Pat. No. 4,707,261, which is a continuation of application Ser. No. 237,050, filed Feb. 23, 1981, now abandoned which is a continuation of Ser. No. 065,018, filed Aug. 9, 1979, now abandoned.

BACKGROUND OF THE INVENTION

1. Field of the Invention

The present invention relates to a tubular membrane filtration module and, more particularly, it relates to a tubular membrane filtration module having a plurality of tubular permeable membranes suitable for treating raw liquids under a comparatively low pressure, such as ultrafiltration, microfiltration, etc.

2. Description of the Prior Art

Various permeable membranes, such as reverse osmosis membranes, ultrafiltration membranes, microfiltration membranes, etc. have been used for their selective permeability. Conditions for their use and the like are disclosed in, for example, U.S. Pat. Nos. 3,133,132, 3,526,588 and 3,567,810. Tubular membrane filtration modules equipped with these membranes have been widely used in many fields such as in the production of fresh water from sea water (desalination), condensation of colloids, treatment of waste liquor and the like as disclosed in, for example, various research and development reports issued by the Office of Saline Water (OSW), U.S.A.

In conventional tubular membrane filtration modules, the permeable membrane is supported by a porous FRP pipe as disclosed in, for example, Rozelle L. T. et al, Research & Development Report No. 531 by Office of Saline Water or a perforated stainless steel pipe as disclosed in, for example, S. Loeb, *Desalination*, 1, p35 (1966). These prior art tubular membrane filtration modules have a rather excessive quality which unnecessarily increases treatment costs. In the case of using these tubular membrane filtration modules under a comparatively low pressure, e.g., about 10 kg/cm$^2$G or less, such as for ultrafiltration or microfiltration, it is not necessary for the module to have such good pressure withstanding property.

Further, in the prior art tubular membrane filtration modules, the permeable membranes and the porous supporting pipes are sealed at the ends by means of packings, retainers or other sealing members as disclosed in, for example, Research & Development Report No. 993 by Office of Saline Water. However, the tubular permeable membranes are difficult to closely bundle using these members with the result that the area of membrane per unit volume of module is small. Further, the cross-sectional area of a flow passage in the module at the sealed portion is reduced and loss of pressure easily occurs which reduces the efficiency of the module and the flux through the membrane.

On the other hand, hollow fiber type (as disclosed in, for example, U.S. Pat. No. 3,228,876) or spiral type (as disclosed in, for example, U.S. Pat. No. 3,367,504) membrane filtration modules have been developed in order to improve the efficiency of the membrane filtration modules and, particularly, to increase the area of the membrane per unit volume of the module. However, these modules easily block and they are difficult to wash physically such as by using a sponge ball to remove scale deposits. Accordingly, in order to use such modules, it is necessary to pre-treat the raw liquid which in turn increases the cost. Furthermore, the above described membrane filtration modules are constructed of a large number of members such as permeable membrane supporting pipes, packings, retainers, headers, etc., and this makes them difficult to manufacture and expensive.

SUMMARY OF THE INVENTION

The present invention is directed to overcoming the above described shortcomings in the prior art membrane filtration modules.

Accordingly, the object of the present invention is to provide tubular membrane filtration modules suitable for use under a comparatively low pressure (such as for ultrafiltration, microfiltration, etc.) which have a simplified structure and can be easily and inexpensively produced.

DETAILED DESCRIPTION OF THE INVENTION

The present invention is explained in more detail by reference to the accompanying drawings.

Figure 1:
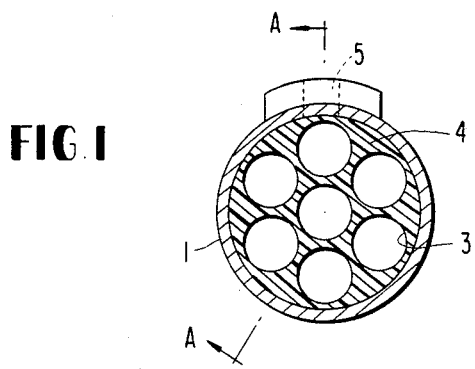
FIG. 1 is a cross-sectional view of a tubular membrane filtration module according to the present invention.
Figure 2:
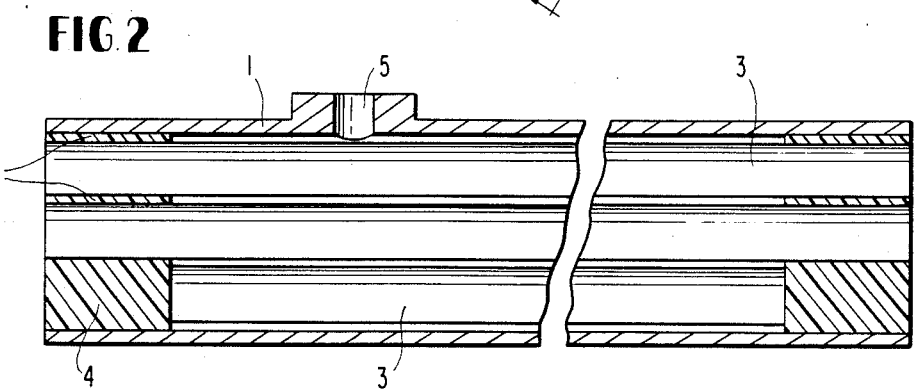
FIG. 2 is a longitudinal cross-section along the line A—A in FIG. 1.
Figure 3:
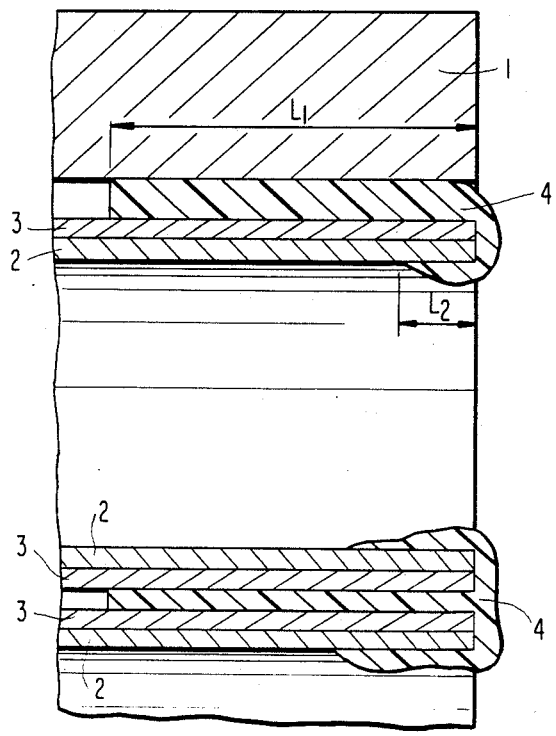
FIG. 3 is an enlarged longitudinal cross-section of the end of the pipe in the module according to the present invention.

As shown in FIGS. 1 to 3, a tubular membrane filtration module of the present invention comprises an outer cylinder 1 and a plurality of water-permeable non-woven fabric pipes 3 having nearly the same length as that of the outer cylinder and having a permeable membrane 2 formed on the inside thereof, which are inserted into the outer cylinder in a closely bundled state such that the open ends thereof are even with the outer cylinder, wherein spaces at the both end portions of the outer cylinder are filled with a cast synthetic resin 4 to fix the non-woven fabric pipes.

In the present invention, the permeable membrane 2 is integrally formed on the inside of the non-woven fabric pipe 3 in a body so as to have a large negative pressure (pressure drawing the walls of the pipe inward) withstanding property. The tubular permeable membrane 2 thus formed generally has an inside diameter of about 4 to 25 mm, preferably about 7 to 13 mm. If the inside diameter of the tubular permeable membrane 2 is less than about 4 mm (which corresponds to the hollow fiber type membrane), blocking tends to occur and physical washing such as with a sponge ball cannot be carried out. On the other hand, if the inside diameter of the tubular permeable membrane 2 is more than about 25 mm, the ratio of the area of the membrane to the diameter of the pipe becomes relatively small and the pressure withstanding property is sometimes insufficient. Further, the thickness of the permeable membrane is generally about 100 to 300 $\mu$m.

Any commercially available membrane can be used as the permeable membrane 2 of the present invention. Suitable examples of the permeable membrane are those made of polyamides (e.g., "Nomex", a product of E. I. Du Pont Co.), polyimides (e.g., as described in U.S. patent application Ser. Nos. 961,167 and 961,168), polysulfones, saponification products of ethylene-vinyl acetate copolymers, cellulose acetates, polyacrylonitriles, polyvinyl chlorides, and the like.

The non-woven fabric pipes 3 and the outer cylinder 1 are disposed such that they do not contact one another and the spaces between them are filled with a cast synthetic resin 4 at the end portions of the module as shown in FIG. 1. Thus, a water sealing property is further secured. Further, the non-woven fabric 3 is not required to be strictly the same length as that of the outer cylinder 1, and it is sufficient if the length thereof is approximately the same as that of the outer cylinder. It will be easily understood that, for example, the membrane filtration module of the present invention can be obtained even if the length of the non-woven fabric pipe is about 10 mm shorter than that of the outer cylinder.

As the non-woven fabric pipes 3 in which a permeable membrane 2 is formed on the inside thereof, polyester non-woven fabric pipes are preferred, but non-woven fabric pipes composed of polyethylenes, polypropylenes or polyamides can also be used as long as they have a sufficient strength under a relatively low pressure, e.g., about 10 kg/cm$^2$G or less, under which ultrafiltration or microfiltration is carried out, then such troubles e.g., ruptures, do not occur on operation. The non-woven fabric pipe may be made of a single layer or of multiple layers.

The non-woven fabric pipe of the present invention generally has a thickness of about 0.1 to 1 mm. Further, the properties of the non-woven fabric pipe generally required are that the porosity is about 25 to 95% and the flux (water permeation rate) is about 1 to 1,000 ml/cm$^2$/min. under a pressure of 1 kg/cm$^2$G.

Figure 4:
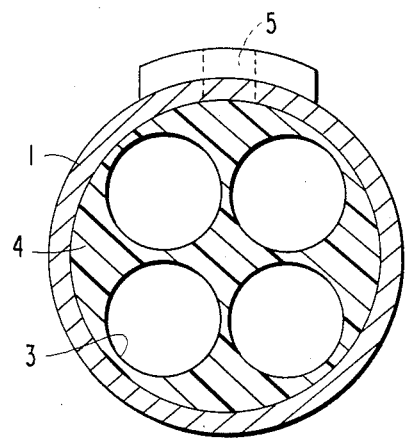
FIG. 4 is a cross-sectional of another embodiment of the module according to the present invention.

These non-woven fabric pipes 3 are closely bundled with one another such that the open ends thereof are even and they are inserted into the outer cylinder 1 having nearly the same length. There is no limitation on the number of non-woven fabric pipes used, but from practical and commercial standpoints 3 to 15 pipes are generally used. FIGS. 1 to 3 show the embodiment where seven non-woven fabric pipes are inserted into the outer cylinder 1 and FIG. 4 shows the embodiment where four non-woven fabric pipes are inserted into the outer cylinder 1.

The spaces at both end portions of the pipes are filled with the synthetic resin 4, and the resin is cast hardened (cured) in a mold, by which the non-woven fabric pipes 3 are bonded to one another and fixed to the outer cylinder 1.

The examples of the synthetic resin 4 are epoxy resins (e.g., Epicoat #828, a product of Shell Chemical Co.), polyester resins, epoxy acrylate hardenable resins and the like. Of these, the epoxy resins are preferred.

As the outer cylinder 1, an iron pipe, a stainless steel pipe, an FRP pipe of a thermoplastic resin pipe, etc. is suitably used. Of these, the synthetic resin pipe such as a polyvinyl chloride pipe, an acrylic resin pipe or a polycarbonate resin pipe, is suitable for use in the present invention, because such is inexpensive and light weight.

Both end portions of the non-woven fabric pipes 3 having the permeable membrane 2 formed on the inside thereof are covered with the above described synthetic resin 4 such that the outside of the open end of the non-woven fabric pipes 3 and the neighbourhood of the open end of the permeable membrane 2 are covered to protect them from the raw liquid as shown in FIG. 3. In the case that the permeable membrane 2 is exposed at the open ends of the non-woven fabric pipe, the permeable membrane is sometimes separated from the non-woven fabric pipe at the open ends when the raw liquid runs against the open end of the non-woven fabric pipe at a high speed or the pipe is subjected to physical abrasion such as during sponge ball washing, etc. On the contrary, where the open ends of the non-woven fabric pipe are covered with the resin together with the permeable membrane as described above, separation of the permeable membrane does not occur.

The coating thickness of the resin at the open ends of the non-woven fabric pipes and permeable membranes and at the inside of the permeable membrane is generally about 200 μm or less, and such thickness can be ignored when compared to the diameter of the pipe. Further, as shown in FIG. 3 the inside depth ($L_2$) neighbouring the open end of the permeable membrane which is coated with the cast synthetic resin must be narrower than the outside depth $L_1$ of the cast synethetic resin. Furthermore, the length $L_1-L_2$ of the permeable membrane is effective for filtration.

The ends of the non-woven fabric pipes and permeable membrane and the inside neighbouring the open ends of the permeable membranes may be coated with resins different from the cast synthetic resin between the fabric pipes. In such a case, the spaces between the pipes are first filled with one synthetic resin and then the ends of the non-woven fabric pipes and permeable membranes and the inside neighbouring the open ends of the permeable membranes are coated with resins different from the first synthetic resin using, for example, a brush.

In order to treat the raw liquid using the tubular membrane separation module of the present invention, the raw liquid is introduced into the non-woven fabric pipes 3 and then conveyed to a subsequent module through a socket, a 180° back bend or the like (not shown in the drawings). On the other hand, the filtrate which passes through the permeable membranes 2 is guided from the space between the non-woven fabric pipes and the outer cylinder 1 to the outside of the module through a port 5.

The tubular membrane filtration module of the present invention has a very simple structure such that a plurality of non-woven fabric pipes having permeable members on the inside thereof are inserted into the outer cylinder in a state that the open ends thereof are arranged uniformly and fixed at the both ends by the hardened synthetic resin. However, it is sufficiently durable for use under a pressure of several kg/cm$_2$G, for example, about 4 kg/cm$_2$G and has a sufficient resistance to a negative pressure. Accordingly, it is suitable as a tubular membrane filtration module for ultrafiltration or microfiltration.

Since the module of the present invention has a simple structure and does not require packings, retainers and other various parts, it not only can be produced easily and cheaply but also has various advantages as compared with the prior art tubular membrane filtration modules or hollow fiber type modules.

First, since the tubular membranes are closely bundled as being different from the prior art tubular membrane filtration modules, there is an advantage that the area of the membrane per unit volume of the module remarkably increases. Second, since the seal of the end portions of the non-woven fabric pipes is made by substantially filling only the outside of the non-woven fabric pipes with the synthetic resin (the inner coating is very thin and can be ignored), the cross-sectional area of the passage is not reduced at the sealed portions and the loss of pressure is remarkably small. Consequently, the raw liquid can be fed at a high flow rate and scale deposits can be prevented.

Furthermore, in the tubular membrane filtration module of the present invention, physical washing such as with a sponge ball can be carried out in contrast to the prior art hollow fiber type modules, and can be used for a long period of time. Further, the module of the present invention can be used as a module for use one time because the cost for production thereof is low.

Moreover, since the non-woven fabric is compatible with the cast synthetic resin due to the non-woven fabric being porous, the end portions of the non-woven fabric pipes can be completely sealed. In addition, since the non-woven fabric itself has a water retention property, drying of the permeable membrane during storage can be easily prevented.

While the invention has been described in detail and with reference to specific embodiments thereof, it will be apparent to one skilled in the art that various changes and modifications can be made therein without departing from the spirit and scope thereof.

What is claimed is:

1. A parallel-flow tubular membrane ultrafiltration module comprising: an outer cylinder of a given length, a plurality of water permeable non-woven fabric pipes each having a permeable membrane formed on the inside thereof and having substantially the same length as the given length of the outer cylinder, said cylinder having a common take-off port from said non-woven fabric pipes, said non-woven fabric pipes each being inserted into the outer cylinder in a closely bundled state with each other, spaces between the outer cylinder and the non-woven fabric pipes at both end portions of the outer cylinder being filled solely with a first hardened synthetic resin bonding the pipes to each other and fixing them to the outer cylinder to provide sealing, the ends of each of the non-woven fabric pipes and the ends of the permeable membranes neighboring the ends of the non-woven fabric pipes being coated solely with a second synthetic resin which may be the same as or different from the first synthetic resin filling any spaces between the outer cylinder and the non-woven fabric pipes, wherein only said first and second resins are utilized for sealing and retaining said non-woven fabric pipes at said ends of said outer cylinder, the permeable membrane in each pipe having an inner diameter of about 4 to 25 mm.

2. The tubular membrane filtration module of claim 1, wherein said non-woven fabric pipes are composed of polyesters, polyethylenes, polypropylenes or polyamides.

3. The tubular membrane filtration module of claim 1, wherein the coating thickness of said cast synthetic resin at the open ends and on the inside of said non-woven fabric pipes is about 200 $\mu$m or less.

4. The tubular membrane filtration module of claim 1, wherein said module comprises 3 to 15 of said non-woven fabric pipes having a permeable membrane formed on the inside inside thereof.

5. The tubular membrane filtration module of claim 1, wherein said permeable membrane has an inner diameter of about 7 to 13 mm.

6. The tubular membrane filtration module of claim 1, wherein said non-woven fabric pipe is constructed of a material sufficient to withstand pressures of about 10 kg/cm$^2$G.

7. The tubular membrane filtration module of claim 1, wherein said non-woven fabric pipe has a porosity of about 25 to 95% and a water permeation rate of about 1 to 1,000 ml/cm$^2$/min. under a pressure of 1 kg/cm$^2$G.

8. The tubular membrane filtration module of claim 1, wherein said permeable membrane is about 100 to 300$\mu$ thick.

* * * * *

REEXAMINATION CERTIFICATE (1538th)
United States Patent [19]
Ikeyama et al.

[11] B1 4,747,946
[45] Certificate Issued * Aug. 27, 1991

[54] TUBULAR MEMBRANE ULTRAFILTRATION MODULE

[75] Inventors: Norio Ikeyama; Noriaki Yoshioka; Shusaku Tamaru; Hisashi Ichinose, all of Osaka, Japan

[73] Assignee: Nitto Denko Corporation, Osaka, Japan

Reexamination Request:
No. 90/001,774, May 22, 1989
No. 90/002,009, Apr. 26, 1990

Reexamination Certificate for:
Patent No.: 4,747,946
Issued: May 31, 1988
Appl. No.: 69,080
Filed: Jul. 2, 1987

[*] Notice: The portion of the term of this patent subsequent to Nov. 17, 2004 has been disclaimed.

Related U.S. Application Data

[63] Continuation of Ser. No. 468,746, Feb. 22, 1983, Pat. No. 4,707,261, which is a continuation of Ser. No. 237,050, Feb. 23, 1981, abandoned, which is a continuation of Ser. No. 65,018, Aug. 9, 1979, abandoned.

[30] Foreign Application Priority Data
Aug. 9, 1978 [JP] Japan ................. 53-97734

[51] Int. Cl.$^5$ .................................. B01D 61/18
[52] U.S. Cl. ..................... 210/321.8; 210/323.2; 210/321.84
[58] Field of Search ............. 55/158; 210/321.89, 210/321.61, 321.8, 323.2, 339, 321.64, 321.79, 433.1

[56] References Cited
FOREIGN PATENT DOCUMENTS
49-48399 12/1974 Japan .
52-106377 9/1977 Japan .
52-106378 9/1977 Japan .

OTHER PUBLICATIONS
Catalog NTU-20100-M4, 6-78, publisher Nitto Electric Industrial, First Edition 1000.

*Primary Examiner*—Frank Spear

[57] ABSTRACT

An improved tubular membrane filtration module including an outer cylinder and a plurality of water permeable non-woven fabric pipes formed on the inside thereof, the non-woven fabric pipes being inserted into the outer cylinder in a closely bundled state, the spaces between the fabric pipes and the outer cylinder at each end thereof being filled with hardened synthetic resin to fix and seal the assembly. The ends of the non-woven fabric pipes are coated with a resin such that the inside coating of resin at the end of the fabric pipes is less than that on the inside thereof.

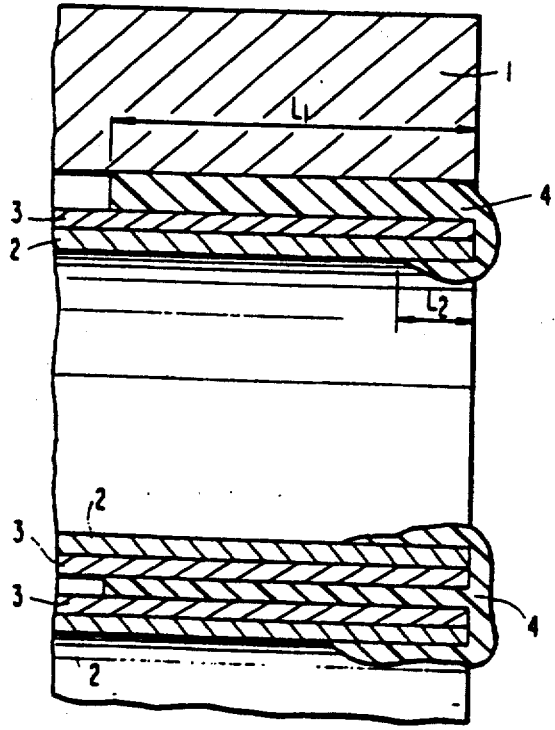

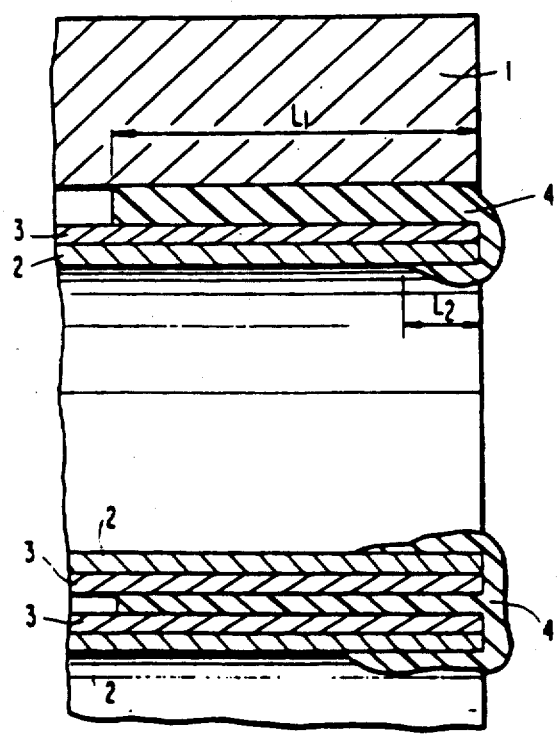

REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

Claim 1 is determined to be patentable as amended.

Claims 2-8, dependent on an amended claim, are determined to be patentable.

New claims 9 and 10 are added and determined to be patentable.

1. A parallel-flow tubular membrane ultrafiltration module comprising:

an outer cylinder of a given length, a plurality of water permeable non-woven fabric pipes *that are unsupported* each having a permeable membrane formed on the inside thereof and having substantially the same length as the given length of the outer cylinder, said cylinder having a common take-off port from said non-woven fabric pipes, said non-woven fabric pipes each being inserted into the outer cylinder in a closely bundled state with each other, spaces between the outer cylinder and the non-woven fabric pipes at both end portions of the outer cylinder being filled solely with a first hardened synthetic resin bonding the pipes to each other and fixing them to the outer cylinder to provide sealing,

[the] *edges at the* ends of each of the non-woven fabric pipes and [the] *edges at the* ends of the permeable membranes neighboring the [ends] *edges* of the non-woven fabric pipes being coated solely with a second synthetic resin which may be the same as or different from the first synthetic resin filling any spaces between the outer cylinder and the non-woven fabric pipes, wherein only said first and second resins are utilized for sealing and retaining said non-woven fabric pipes at said ends of said outer cylinder, the permeable membrane in each pipe having an inner diameter of about 4 to 25 mm, *and raw liquid flows into the inside of said plurality of said non-woven fabric pipes and filtrate accumulates on the outside of said non-woven fabric pipes inside said outer cylinder and is removed through said common take-off port.*

*9. The tubular membrane filtration module of claim 1, wherein said water permeable non-woven fabric pipes are physically descaled.*

*10. The tubular membrane filtration module of claim 1, wherein said water permeable non-woven fabric pipes are physically descaled using a sponge ball.*

* * * * *